July 1, 1924.
C. S. SMITH
1,499,600
MAKING COLLOIDAL SUSPENSIONS
Filed April 5, 1922     2 Sheets-Sheet 1
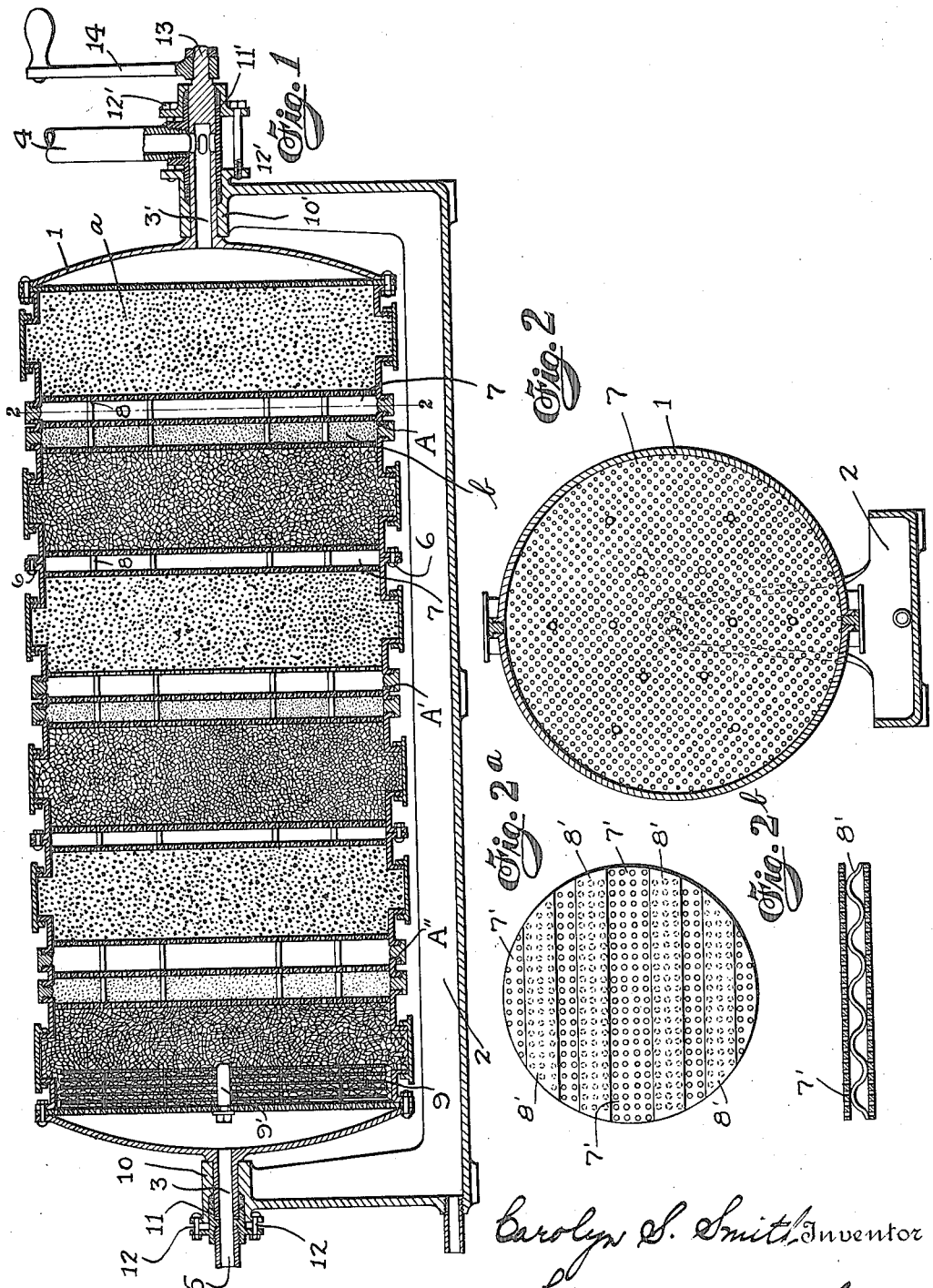

July 1, 1924.

C. S. SMITH 1,499,600

MAKING COLLOIDAL SUSPENSIONS

Filed April 5, 1922      2 Sheets-Sheet 2

Carolyn S. Smith Inventor

By her Attorneys
Emery, Varney, Blair & Haynes

Patented July 1, 1924.

1,499,600

UNITED STATES PATENT OFFICE.

CAROLYN S. SMITH, OF BROOKLYN, NEW YORK.

MAKING COLLOIDAL SUSPENSIONS.

Application filed April 5, 1922. Serial No. 549,907.

*To all whom it may concern:*

Be it known that I, CAROLYN S. SMITH, a citizen of the United States, residing in the borough of Brooklyn, county of Kings and State of New York, have invented an Improvement in Making Colloidal Suspensions, of which the following is a specification.

My present invention relates to a filtering tank for the conversion of suspended matter in water to a colloidal state, which would be of high value in the industries, as will be shown hereinafter.

The object of my invention is to provide an extremely pure water which, by electrolytic treatment, will be made of high value industrially and physiologically.

For the purposes of my invention I provide an apparatus which will be more clearly illustrated in the annexed drawings, in which—

Figure 1 represents a plan view of one embodiment of my invention;

Figure 2 is a sectional elevation along line 2—2 of Figure 1, showing my screen construction;

Figure 4:
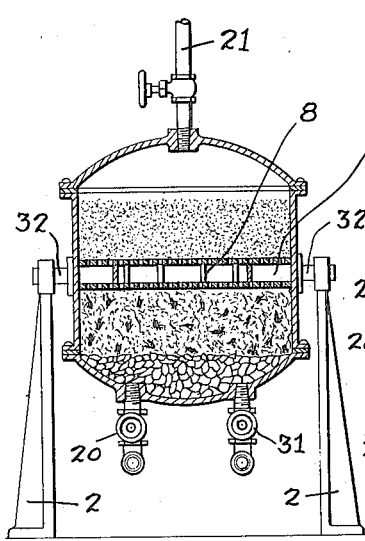
Figure 3:
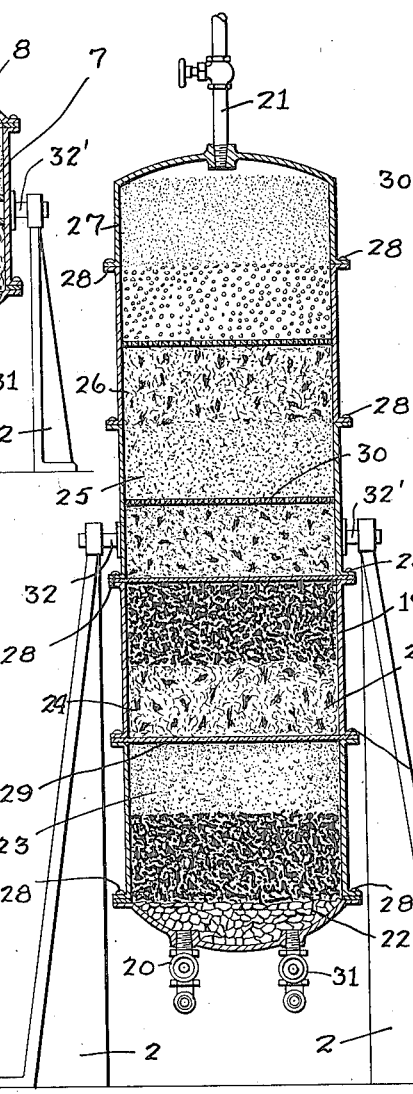
Figure 5:
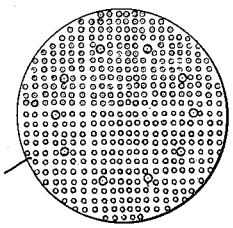
Figure 6:

Figure 2$^a$ is a section along the line 2—2 of Figure 1 showing a modified form of screen;

Figure 2$^b$ is an elevation showing the separator used;

Figure 3 is a vertical plan view of a second embodiment of my invention;

Figure 4 is a sectional view of a modified form of separator;

Figure 5 is a plan view of another form of screen as shown in section in Figure 4;

Figure 6 is a transverse sectional view of a modified form of screen, and

Figure 7:
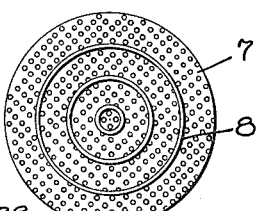

Figure 7 is a plan view of the separator shown in Figure 6 with the top screen removed.

Referring now to the embodiment illustrated in Figures 1 and 2, my improved form of apparatus consists of a cylindrical tank 1 supported in a frame 2 by means of trunnions 3, 3'. Water or other liquid to be filtered is introduced under pressure through the inlet pipe 4.

The tank may be composed of any number of sections A, A', A'', etc., (here shown as three) suitably bolted together by bolts 6, and each section may consist of two separate compartments or treatment chambers *a, b*, similar in shape to a Glover tower, and each filled with finely divided porous material through which the water to be treated percolates. It is to be understood that while I have here illustrated three sections I do not limit myself to that number, as I may insert more or remove one or more, depending upon the character of the water to be treated. The chambers *a* may be filled with a mixture of aluminum and sand, for example, the object being to provide first an inert filtering substance in which no electrolytic action will be set up. The chambers *b* are made in two parts, one of which contains finely divided metal—for example, aluminum—and the other and larger of which contains crushed carbon. These two bodies will set up electrolytic action. I do not limit myself to these substances, for any two bodies which, when mixed with an electrolyte, will set up a current may be used.

The chambers *a* are separated from chambers *b* by porous or perforated separators 7, and in the chambers *b* the aluminum and carbon are kept from direct contact by means of a similar separator. This separator consists of two or more porous or perforated screens kept apart by rings 8 of silica or copper.

In the chamber A'' I may provide in the larger or carbon container chamber porous screens 9 of aluminum or other suitable electronegative metal. These are bolted together by a bolt 9' and are adapted in combination with the carbon to set up a more intense electrolytic action so that the materials in the liquid may finally emerge in a very high state of colloidal suspension.

From the compartment A'' the water passes to the reservoir through the outlet pipe 5, which is preferably made of smaller diameter than the inlet pipe to bring about the proper pressure and suction. The trunnions 3, 3' are supported in a casing comprising an apertured part 10, 10' integral with the frame 2, figured portions 11, 11', which slide into apertures in the parts 10, 10', the two portions being bolted together by bolts 12, 12'.

If desired, the outlet end may be raised or lowered so that the filter need not be always in a horizontal position, but may be tilted to any desired angle to further facilitate the production of a better result.

In order that the filter may be as efficient as possible, it is desirable that the incoming water shall percolate through every portion of it. I therefore provide a crank 14 attached to the trunnion 3' at 13 so that I may turn the filter during operation.

In place of the separator 7 I may use the type of separator illustrated by Figures 2ª and 2ᵇ. This separator comprises apertured metallic discs 7'. Across the face of these discs I may run a number of spiral copper ribbons 8' (here shown as four) which give the screen the appearance of having a number of corrugations. This arrangement affords resiliency of the screens and makes them better suited for the purpose to which they are subjected than if they were separated by rigid bands.

Referring to Figures 3 to 7 inclusive, which illustrate the second embodiment of my invention, 19 represents an upright tank with an inlet pipe 20 and an outlet pipe 21 of smaller diameter than the inlet pipe so that when the water is introduced from below the proper suction would be obtained to draw it upwards. In this tank I provide first a layer 22 of finely crushed carbon or alloy of aluminum-carbon, and a number of filtering sections of which I have here shown five, 23, 24, 25, 26, 27, flanged together at 28. I may provide between one compartment and the next succeeding compartment a porous screen 29, and between the electrolytic elements in each compartment a screen 30 to keep them from direct mixture. In the lower compartment 23 I may provide a layer of carbon and a layer of aluminum. The remaining compartments may contain an alloy of aluminum as the negative electrode and a layer of carbon as the positive electrode, or the aluminum or alloy thereof may be the positive electrolyte and the negative may be sulphur or similar material. In the top compartment 27 I may provide sand or other inert material which serves merely to filter the water after it has been treated with the electrolytic media.

When this form of tank is used, it is generally maintained in a vertical position but this is by no means always necessary or even desirable. I therefore provide trunnions 32, 32' on which the tank may be supported and may be tilted to any desired angle. I also provide at the lower end a pipe 31 for cleaning the apparatus.

Some of the important advantages of treatment of the water in this way are as follows:

*Boiler water.*—The colloidal water makes a fine water for boilers, the matter in suspension being oxidized and that which is not oxidized being put in a colloidal state, which increases the pressure by making more vapor. Aside from this the resolving of a great part of the water into its constituent gases increases the pressure and a less amount of coal can be used. It also coats the pipes with a very thin skin of the colloid which preserves them.

*Ice plants.*—Ice plants require a very pure water. This can be obtained economically by these filters and a by-product of oxygen made salable.

*Photography.*—It tends to keep the gelatine in good shape for coloring colored slides, making them receptive to the color.

*Salt.*—By the use of my process the manufacture of salt from brine may be effected without the expensive process of bleaching in use at present.

By this process a water may be obtained which is extremely efficient in reducing the expense of maintaining laundries, because in its oxidized state it exercises per se the bleaching action which soap and other artificial bleachers are now used to bring about.

Various possible embodiments may be made of the invention and various changes in the embodiments described may be made, all within the scope of the subjoined claims.

I claim as my invention:

1. In a filtering tank a plurality of sections through which liquid under pressure percolates, each section containing a chamber filled with electrolytic materials and a chamber containing an inert mixture of metal and silica.

2. In a filtering tank a compartment comprising two chambers, one of which contains filtering material, the other of which contains electrolytic material at its inlet extremity and an electrolytic couple at its further extremity, said couple comprising finely divided carbon closely packed between apertured metallic discs; said carbon constituting the positive element and said metallic discs constituting the negative element of the couple.

3. In a filtering tank, a cylindrical body, an inlet pipe, an outlet pipe, filtering compartments, a frame supporting said tank, trunnions mounted rotatably in said frame, a crank mounted in the frame adjacent to one of said trunnions whereby said tank may be turned.

4. In a filtering tank containing filtering material and electrolytic material, a porous screen separating said filtering material and said electrolytic material, said screen comprising two apertured metallic discs united at intervals by copper or silica ribbons.

5. In filtering apparatus, the combination with a tank, of a series of filtering couples in said tank, each couple comprising unit elements in the form of different finely divided materials arranged in layers, one unit of each layer acting as a positive element and the other unit acting as a negative element, and the unit elements of each couple so formed being in direct contact with each other along a well defined dividing contact area, so that electrolytic action is set up in the water, and means for forcing water under pressure through said filtering couples whereby the filtration takes place in the presence of percolation, pressure, and electrolytic action, and the residue descends to the bottom of the tank.

6. In apparatus for making colloidal suspensions by electrolytic action, a filtering tank having compartments containing filtering material and materials capable of setting up electrolytic action, said compartments being defined by a plurality of screens comprising apertured metallic discs joined at intervals by a plurality of copper ribbons said ribbons extending spirally against the faces of the discs, and said screens separating the said filtering material from the before mentioned materials capable of setting up electrolytic action and also separating the elements of the latter materials from each other.

In testimony whereof, I have signed my name to this specification this 31st day of March, 1922.

CAROLYN S. SMITH.